Feb. 21, 1956 S. D. BRADLEY 2,735,672
COMBINED LINER AND PROTECTOR FOR LEAF SPRINGS
Filed Dec. 16, 1950

INVENTOR.
Stephen D. Bradley
BY
Maxwell N. Murphy
ATTORNEY.

United States Patent Office 2,735,672
Patented Feb. 21, 1956

2,735,672

COMBINED LINER AND PROTECTOR FOR LEAF SPRINGS

Stephen D. Bradley, Detroit, Mich., assignor, by mesne assignments, to Spring Cover Manufacturing Company, Inc., Detroit, Mich., a corporation of Michigan Application December 16, 1950, Serial No. 201,144

2 Claims. (Cl. 267—49)

This invention relates to a combined liner and protector for laminated or leaf springs, particularly springs such as those used in automobiles and railway rolling stock.

During recent years it has been customary to cover automobile suspension springs of the leaf type with metal covers having an inside liner of canvas impregnated with lubricant. The liner is simply wrapped around the spring for retaining the lubricant and does not extend between the leaves.

In instances where covers are not used, liners or inserts of rubber-like or lubricant impregnated material are disposed between the spring laminations. In both instances, the object is to prevent entry of grit and dirt between the leaves and to facilitate sliding of the leaves during flexing of the spring. Both covers and liners have advantages, and it is generally recognized that use of both in combination would be especially advantageous, but cost has discouraged such use.

It has been proposed to provide liners of plastic or fabric material having overlapping beads or flange portions which are adapted to overlie the edges of the leaves adjacent the liner, thereby to guard against entry of grit and dirt. These types of liners work well when the spring leaves are of uniform width and thickness, but the springs generally used in large quantities in high production models of motor vehicles are made up of leaves which vary in width and thickness up to a sixteenth of an inch or more and are non-uniform throughout their length in many cases.

When beaded or flanged liners are used with these leaves, a good seal between leaves is frequently not obtained and in other instances the liner is cut or worn out by a leaf of excessive width.

An object of the present invention is to provide a low-cost combined spring cover and protector which covers the edges of the spring leaves, thereby protecting the spring from entry of dirt and water between leaves, and in addition separates the leaves from one another by a layer of anti-friction material.

Another object is to provide a spring liner which can be used with leaves of varying width and thickness and still secure a good seal at the edges of the leaves.

Other objects and advantages will appear from the following specification which describes a preferred form of the invention.

In the drawings accompanying the specification:

Figure 1:
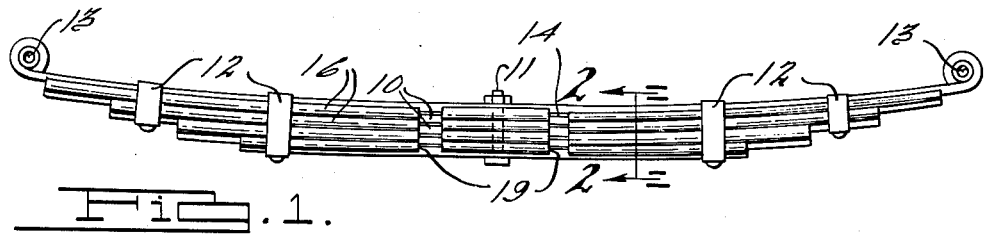
Fig. 1 is an elevation of a leaf spring provided with the combined cover and protector described herein.
Figure 2:
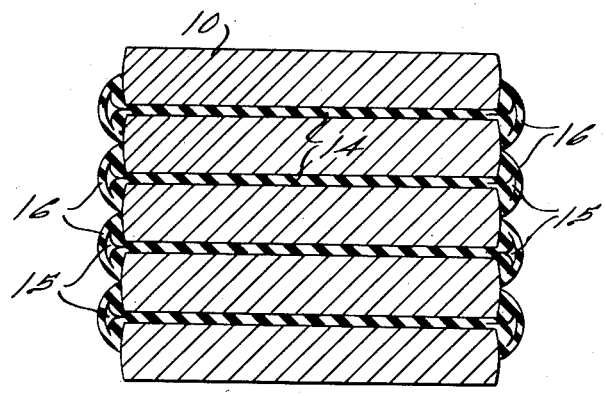
Fig. 2 is a sectional view of an enlarged scale along line 2—2 of Fig. 1.
Figure 3:
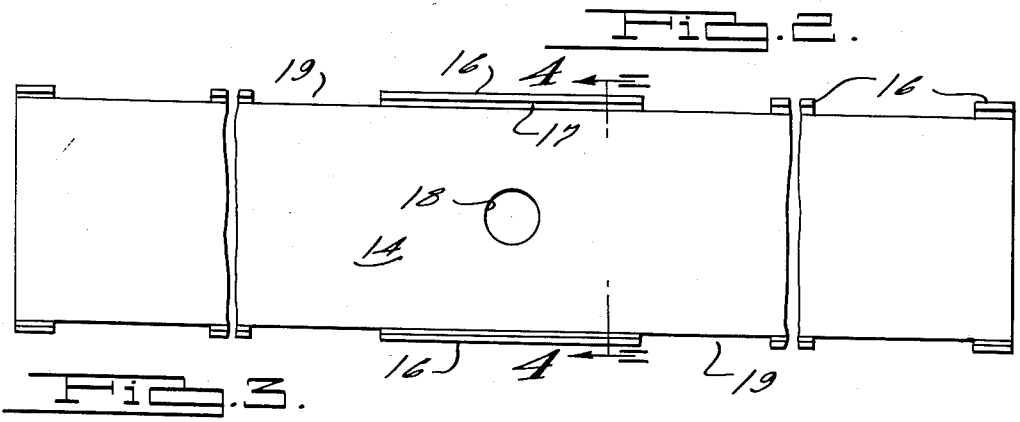
Fig. 3 is a plan view of a single liner as shown in Fig. 2.

Figs. 1 and 2 show a leaf spring assembly comprising leaves 10, kingbolt 11 and clips 12. The top leaf is provided with eyes 13 for attachment to the chassis of a vehicle. The kingbolt 11 maintains the leaves in assembly and the clips 12 prevent the leaves from misalignment.

In the example being discussed, a liner 14 is disposed between each pair of leaves. The liner is of double channel shape and has a central portion extending lengthwise substantially co-extensively with the leaf on which it rests, and beaded portions 16 which extend upwardly and downwardly a sufficient distance to partially overlap the edges of the adjacent leaves.

As may be seen from Fig. 2, the beaded edge portions 16 are preferably made of such width that the bead of one liner engages the bead of the adjacent liners and when the spring is assembled the beads are placed under slight compression and a tight seal between the beads is achieved. This provides protection for the sides of the springs and permits flexing of the spring without breaking the seal.

Figure 4:
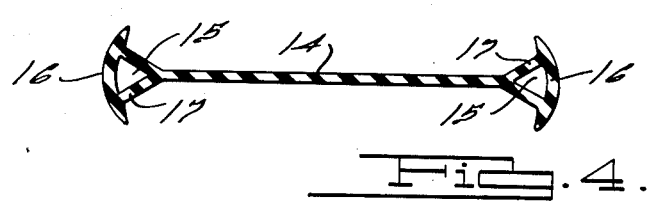
Fig. 4 is a sectional view of a liner per se.

Referring now to Figs. 2 and 4, it may be seen that the bead 16 is rounded and is connected with the central portion of the liner by spaced webs 17 which enclose a hollow space 15. The latter is shown to be of triangular shape, and while the precise shape is not of critical importance, that shown is advantageous as will appear.

As can be more clearly seen from Fig. 2, when the spring is assembled with the interleaved liners, the edges of the leaves 10 compress the web portions 17 and thereby cause the bead positions 16 to be drawn inwardly at the top and bottom. This causes the bead to grip the leaf and provide a tight, dirt-proof fit. In addition, any variation in the width or thickness of the leaf is compensated for and a tight assembly of parts results.

The liners have cut-outs where necessary, as indicated at 18 and 19, to accommodate the kingbolt, U-bolts (not shown) and spring clamps. The amount of overlap of the bead portions 16 is not critical, but in general should be sufficient to maintain a gap-free relationship between the liner at the sides of the spring during flexing of the spring in normal use.

While various materials have been found satisfactory for use as spring liners, I prefer to use extruded polyethylene. Polyethylene is commercially obtainable on the open market and may be molded or extruded in standard plastic handling apparatus. The material in its solid state has a waxy surface which is resistant to effect of the element, is self-lubricating to a considerable extent and maintains a substantially constant friction characteristic. This latter feature is important in a spring liner in that it tends to prolong the built-in ride characteristic of the suspension system.

Figure 5:
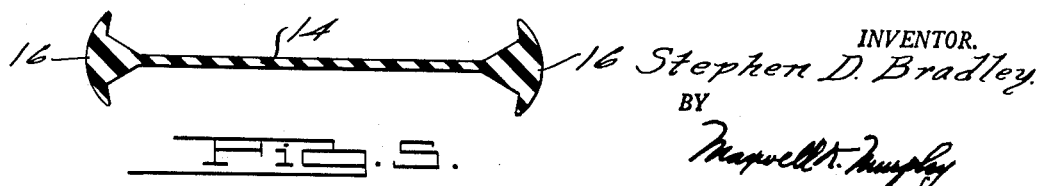
Fig. 5 is a sectional view of a modified form of liner.

Fig. 5 illustrates in section a modified liner in which the triangular space 15 is eliminated. The material in both types of liners is extruded through a die preferably formed to provide an arcuate shape to the bead portions 16. This construction makes the cover liner tend to grip the sides of the leaves and seal the spaces between leaves against entry of dirt. While this form of liner does not provide the flexibility of the Fig. 4 form, it is easier to manufacture and is satisfactory in instances where the spring leaves run quite uniform.

The combined cover and liner is assembled along with the spring leaves and provides a cover for excluding dirt and grit as well as a self lubricating liner, which under normal circumstances of use will last the life of the spring without attention or service.

While I have shown for illustrative purposes only preferred embodiments of my invention, it will be understood that by so doing, I do not intend to limit the same to the precise construction, material or relative size shown, but only as set out in the appended claims.

I claim:

1. A liner and protector for leaf springs comprising an elongated strip of flexible and deformable material having beaded side edge portions, said strip being adapted to be arranged between adjacent leaves of the spring and having a substantially flat central portion of less width than the leaves with which it is to be assembled, the beaded side edge portions of the strip being connected to said central portion by angularly disposed webs joined at their connection with said central portion so as to define an elongated hollow space therebetween to permit compression of said webs against each other by the leaves with which the strip is to be assembled.

2. A laminated spring assembly comprising a plurality of spring leaves, inserts comprising strips of compressible material having central portions between the leaves separating the leaves substantially throughout their lengths, said inserts having beaded side edge portions overlapping the adjacent leaves and engaging the beaded portions of the adjacent inserts, and connecting portions connecting said beaded portions with said central portions, said connecting portions comprising spaced angularly disposed webs joined at their connection with said central portion and diverging therefrom whereby said connecting portions are compressed by said leaves to draw said beaded portions into sealing engagement against the sides of said leaves.

References Cited in the file of this patent

UNITED STATES PATENTS

| | | |
|---|---|---|
| 1,254,493 | Frood | Jan. 22, 1918 |
| 1,330,512 | Billinghurst | Feb. 10, 1920 |
| 2,649,296 | Dow | Aug. 18, 1953 |

FOREIGN PATENTS

| | | |
|---|---|---|
| 184,640 | Great Britain | Aug. 24, 1922 |
| 290,927 | Germany | Mar. 28, 1916 |
| 590,911 | France | Mar. 27, 1925 |